United States Patent [19]
Peterson

[11] Patent Number: 5,740,134
[45] Date of Patent: Apr. 14, 1998

[54] MUSICAL CD CREATION UNIT

[76] Inventor: Tim Peterson, 2332 Watkins Dr., Columbus, Ga. 31907

[21] Appl. No.: 696,045

[22] Filed: Aug. 13, 1996

[51] Int. Cl.$^6$ .................................................. G11B 17/22
[52] U.S. Cl. ........................................ 369/30; 428/64.4
[58] Field of Search ................................ 369/30, 34, 36, 369/38, 85, 15, 84, 59; 375/220, 240; 428/64.1, 64.3, 64.4

[56] References Cited

U.S. PATENT DOCUMENTS 5,592,511  1/1997  Schoen et al. ........................ 375/220

*Primary Examiner*—Ali Neyzari

[57] ABSTRACT

A new Musical CD Creation Unit for providing both review and recording functions for the automated merchandising of music entertainment on recordable CDs. The inventive device includes a storage means, a selection means, and a production means. A CD jukebox of the kind commonly available and used in commercial markets provides is used to store musical selections. A computer terminal having a display monitor and input means, such as a computer keyboard or a touch screen allows a customer to review and create a musical selection to be reproduced on a recordable CD. Predetermined musical selections allow a customer to make selections based on music type, such as jazz, pop, rock, country, soul, gospel, or blues, popularity, such as "Top 20 Hits," artist, or other options. To provide fully automated merchandising capabilities, the Musical CD Creation Unit has "vending" features including a purchase amount display, a magnetic card reader for credit cards, and a currency changer for cash such that a customer can purchase the recordable CD without assistance from store personnel.

14 Claims, 2 Drawing Sheets

MUSICAL CD CREATION UNIT

BACKGROUND OF THE INVENTION

1. Field of the Invention

The present invention relates to CD selection and recording systems and more particularly pertains to a new Customized Audio Selection and Production Unit for providing both review and recording functions for the automated merchandising of music entertainment on recordable CDs.

2. Description of the Prior Art

The use of CD selection and recording systems is known in the prior art. More specifically, CD selection and recording systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art CD selection and recording systems include U.S. Pat. No. 4,811,325; U.S. Pat. No. 4,646,171; U.S. Pat. No. 4,937,807; U.S. Pat. No. 4,672,480; and U.S. Pat. No. 4,355,338.

While these devices fulfill their respective, particular objectives and requirements, the aforementioned patents do not disclose a new Musical CD Creation Unit. The inventive device includes a storage means, a selection means, and a production means.

In these respects, the Musical CD Creation Unit according to the present invention substantially departs from the conventional concepts and designs of the prior art, and in so doing provides an apparatus primarily developed for the purpose of providing both review and recording functions for the automated merchandising of music entertainment on recordable CDs.

SUMMARY OF THE INVENTION

In view of the foregoing disadvantages inherent in the known types of CD selection and recording systems now present in the prior art, the present invention provides a new Musical CD Creation Unit construction wherein the same can be utilized for providing both review and recording functions for the automated merchandising of music entertainment on recordable CDs.

The general purpose of the present invention, which will be described subsequently in greater detail, is to provide a new Musical CD Creation Unit apparatus and method which has many of the advantages of the CD selection and recording systems mentioned heretofore and many novel features that result in a new Musical CD Creation Unit which is not anticipated, rendered obvious, suggested, or even implied by any of the prior art CD selection and recording systems, either alone or in any combination thereof.

To attain this, the present invention generally comprises a storage means, a selection means, and a production means.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Musical CD Creation Unit apparatus and method which has many of the advantages of the CD selection and recording systems mentioned heretofore and many novel features that result in a new Musical CD Creation Unit which is not anticipated, rendered obvious, suggested, or even implied by any of the prior art CD selection and recording systems, either alone or in any combination thereof.

It is another object of the present invention to provide a new Musical CD Creation Unit which may be easily and efficiently manufactured and marketed.

It is a further object of the present invention to provide a new Musical CD Creation Unit which is of a durable and reliable construction.

An even further object of the present invention is to provide a new Musical CD Creation Unit which is susceptible of a low cost of manufacture with regard to both materials and labor, and which accordingly is then susceptible of low prices of sale to the consuming public, thereby making such Musical CD Creation Unit economically available to the buying public.

Still yet another object of the present invention is to provide a new Musical CD Creation Unit which provides in the apparatuses and methods of the prior art some of the advantages thereof, while simultaneously overcoming some of the disadvantages normally associated therewith.

Still another object of the present invention is to provide a new Musical CD Creation Unit for providing both review and recording functions for the automated merchandising of music entertainment on recordable CDs.

Yet another object of the present invention is to provide a new Musical CD Creation Unit which includes a storage means, a selection means, and a production means.

Still yet another object of the present invention is to provide a new Musical CD Creation Unit that provides for the option to record any desired selection on a recordable CD for customer purchase.

Even still another object of the present invention is to provide a new Musical CD Creation Unit that fulfills the need for a review and record CD jukebox having "vending" features and full automated merchandising capabilities for use in record stores as well as bars, lounges, night clubs, pizza shops, or other recreational and entertainment venues.

Even still another object of the present invention is to provide a new Musical CD Creation Unit that permits a customer to review a music selection for entertainment purposes as well as for on-location purchase of the music without purchasing the entire CD.

Even still another object of the present invention is to provide a new Musical CD Creation Unit that would be fully automated and no more complex than a traditional jukebox to operate.

Even still another object of the present invention is to provide a new Musical CD Creation Unit that would allow customers to explore and preview music selections prior to purchase and substantially reduce the need for sales employees for customer assistance.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
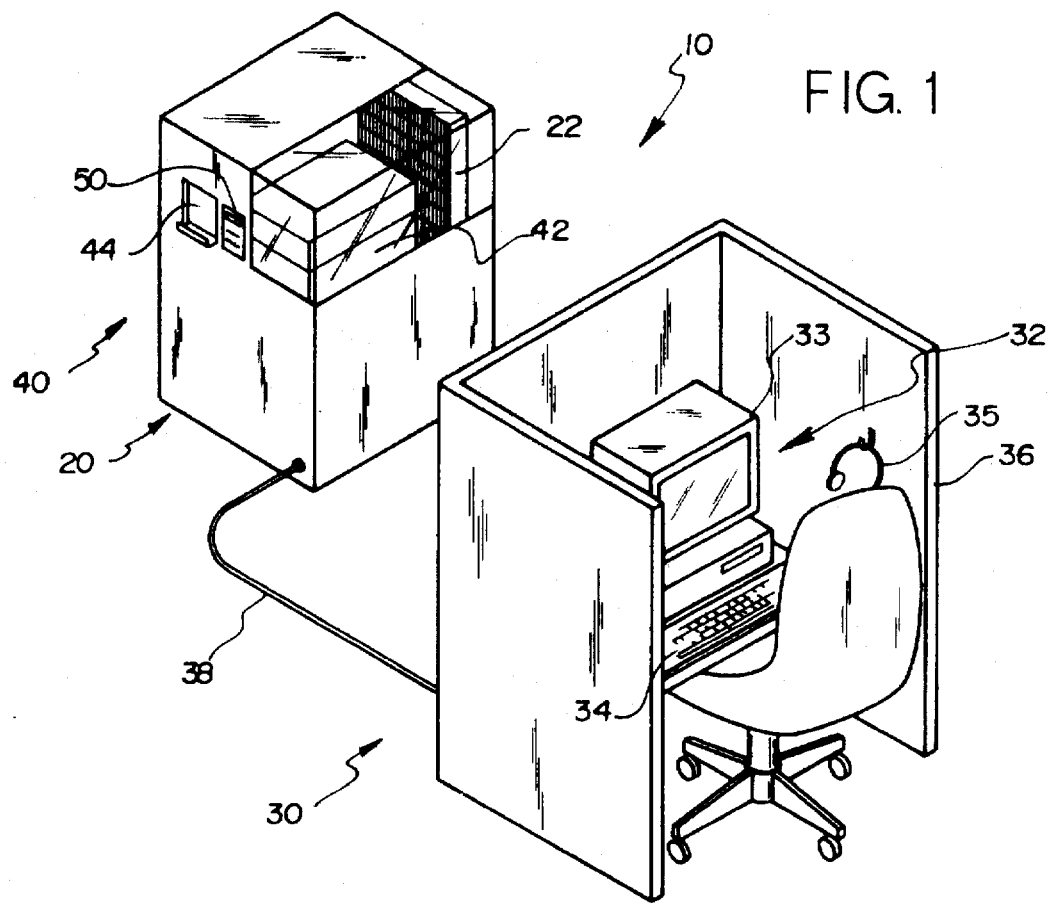
FIG. 1 is an isometric illustration of a new Musical CD Creation Unit according to the present invention.

With reference now to the drawings, and in particular to FIGS. 1 through 4 thereof, a new Musical CD Creation Unit embodying the principles and concepts of the present invention and generally designated by the reference numeral 10 will be described.

Figure 2:
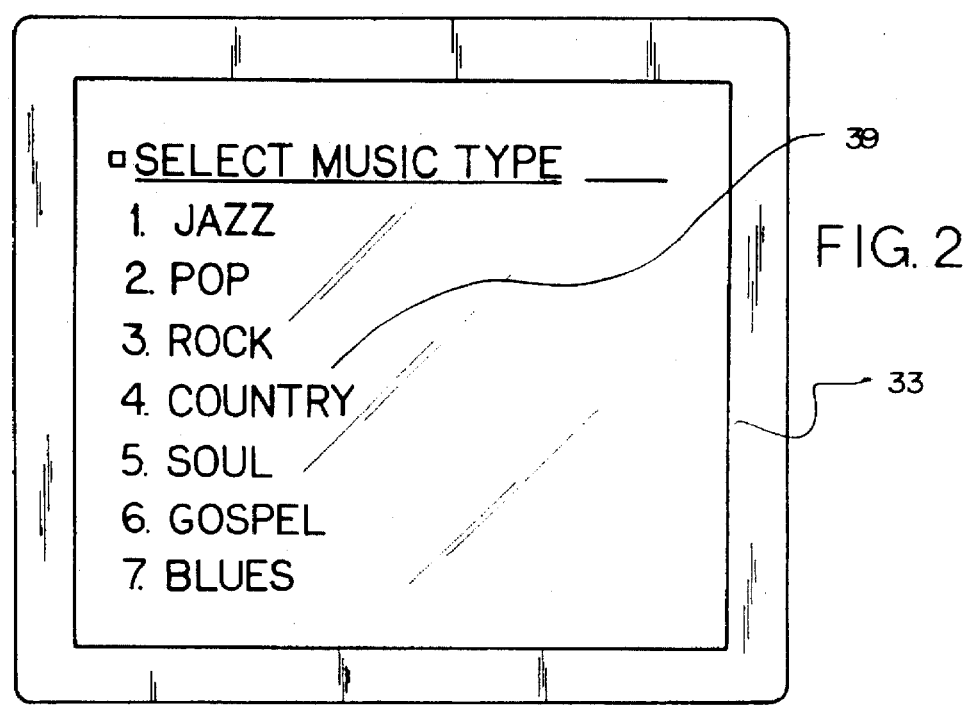
FIG. 2 is an enlarged view of the display monitor used for making musical selections according to the present invention.

More specifically, it will be noted that the Musical CD Creation Unit 10 comprises a storage means 20, a selection means 30, and a production means 40. The storage means 20 further comprises a CD jukebox 22 of the kind commonly available and used in commercial markets. As best illustrated in FIG. 1, the selection means 30 further comprises a computer terminal 32 having a display monitor 33 and input means, such as a computer keyboard 34 or a touch screen. The selection means 30 is connected to the storage means 20 and the production means 40 by a unit interface cable 38. As best illustrated in FIG. 2, the selection means 30 further comprises a predetermined entry means 39 for allowing a customer to review and record predetermined musical selections by type, such as jazz, pop, rock, country, soul, gospel, or blues, by popularity, such as "Top 20 Hits," by artist, or by other predetermined musical selections.

Figure 3:
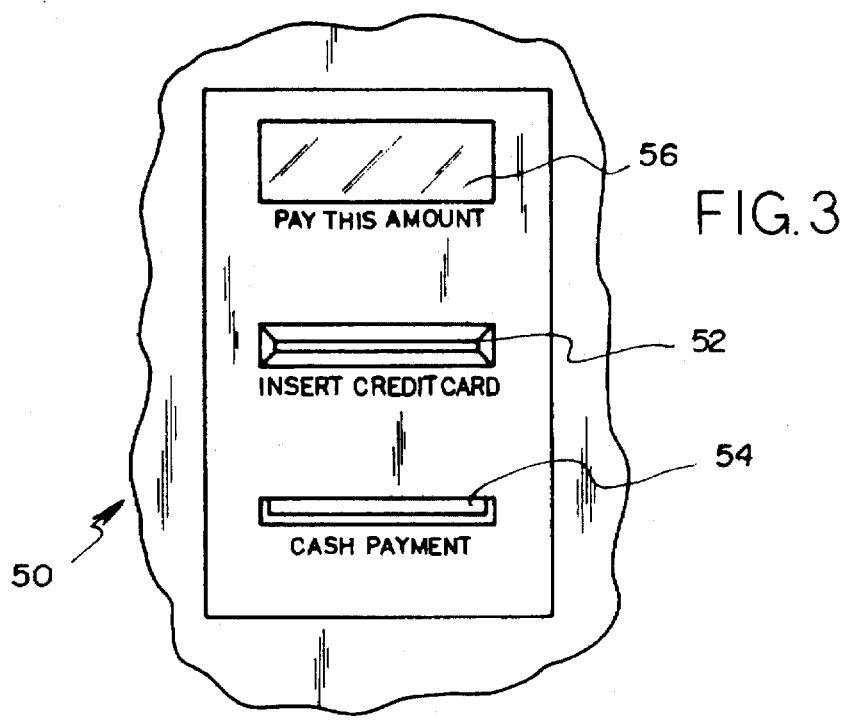
FIG. 3 is an enlarged view of the payment means allowing for automated customer purchase of a recordable CD created according to the present invention.
Figure 4:
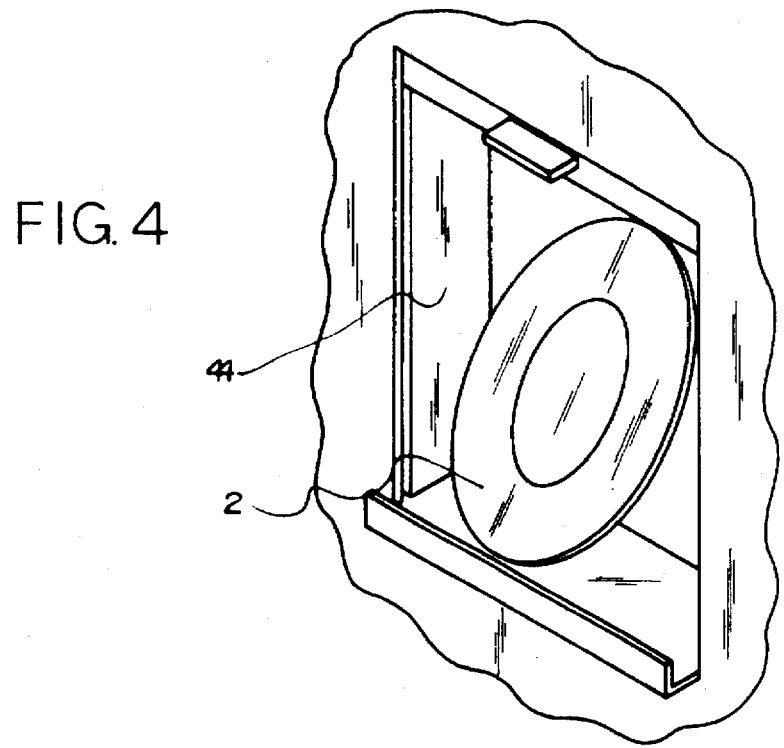
FIG. 4 is an enlarged view of the CD dispenser according to the present invention.

The production means 40 further comprises a CD recorder 42 for recording on a recordable CD 2. After the desired selections are recorded on the recordable CD 2, the recordable CD 2 is dispensed from the production means 40 by a CD dispenser 44, as best illustrated in FIG. 4. To provide fully automated merchandising capabilities, the Musical CD Creation Unit 10 has "vending" features. As best illustrated in FIG. 3, the Musical CD Creation Unit 10 further comprises a payment means 50 having a purchase amount display 56, a magnetic card reader 52 for credit cards, and a currency changer 54 for cash such that a customer can purchase the recordable CD 2 without assistance from store personnel.

In use, a customer can sit in a personal cubicle 36 and review musical selections played by the CD jukebox 22. To avoid disturbing others, a customer can wear headphones 35. The customer uses a computer terminal 32 to view and enter personal musical selections to be recorded on a recordable CD 2. Once a customer completes their personal musical selections, the CD recorder 42 records the personal musical selections on the recordable CD 2. The recordable CD 2 is dispensed from the CD dispenser 44. "Vending" features allow a customer to pay for the service by means of credit card with a magnetic card reader 52 or cash with a currency changer 54. The cost of the service appears on a purchase amount display 56.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A unit for creating a customized digital audio product on a recordable digital medium, comprising:

a storage means for storing a plurality of digital musical selections;

a selection means connected with said storage means for selectively reviewing said plurality of digital musical selections and selecting a user-selected musical compilation from said plurality of digital musical selections to be compiled into said customized digital audio product, said selection means including a plurality of preselected musical compilations each corresponding to a specific musical criterion, wherein said specific musical criterion comprises at least one of a selected musical artist, a selected musical type, and a selected musical popularity, said selection means including an audio output means for enabling a user to listen to a selected one of said plurality of digital musical selections;

a production means connected with said selection means and said storage means for reproducing at least one of said user-selected musical compilation and one of said plurality of preselected musical compilations on said recordable digital medium to create said customized digital audio product; and a payment means for permitting on-site purchase of said customized digital audio product.

2. The unit of claim 1, wherein said storage means comprises a compact disc jukebox.

3. The unit of claim 1, wherein said selection means comprises a computer terminal having a display monitor and an input means.

4. The unit of claim 3, wherein said input means comprises a computer keyboard.

5. The unit of claim 3, wherein said input means comprises a computer touch screen.

6. The unit of claim 1, wherein said production means comprises a compact disc recorder for reproducing said musical compilation on a recordable compact disc.

7. The unit of claim 1, wherein said production means includes a dispenser for on-site dispensing of said recordable digital medium from said production means after said customized digital audio product has been created.

8. The unit of claim 1, wherein said payment means includes a purchase amount display.

9. The unit of claim 1, wherein said payment means includes a magnetic card reader for credit cards.

10. The unit of claim 1, wherein said payment means includes a currency changer for cash.

11. A unit for creating a customized digital audio product on a recordable compact disc, comprising:

a storage means for storing a plurality of digital musical selections;

a selection means connected to said storage means for selectively reviewing said plurality of digital musical selections and selecting a user-selected musical compilation from said plurality of digital musical selections to be compiled into said customized digital audio product, wherein said selection means comprises an on-site computer terminal including a display monitor and an input means, said selection means including a plurality of preselected musical compilations corresponding to a specific musical criterion, wherein said specific musical criterion comprises at least one of a selected musical artist, a selected musical type, and a selected musical popularity, said selection means including an audio output means for enabling a user to listen to a selected one of said plurality of digital musical selections;

a production means connected to said selection means and said storage means for reproducing at least one of said user-selected musical compilation and one of said plurality of preselected musical compilations on said recordable compact disc to create said customized digital audio product, wherein said production means comprises an on-site compact disc recorder for reproducing said musical compilation on said recordable compact disc; and a payment means for permitting on-site purchase of said customized digital audio product without assistance from store personnel, wherein said payment means includes at least one of a magnetic card reader for credit cards and a currency changer for cash.

12. The unit of claim 11, wherein said input means comprises a computer keyboard.

13. The unit of claim 11, wherein said input means comprises a computer touch screen.

14. The unit of claim 11, wherein said audio output means comprises a pair of headphones.

* * * * *